(12) United States Patent
Noh et al.

(10) Patent No.: US 9,325,962 B2
(45) Date of Patent: Apr. 26, 2016

(54) METHOD AND SYSTEM FOR CREATING DYNAMIC FLOATING WINDOW FOR STEREOSCOPIC CONTENTS

(71) Applicant: KOREA ADVANCED INSTITUTE OF SCIENCE AND TECHNOLOGY, Daejeon (KR)

(72) Inventors: Jun Yong Noh, Daejeon (KR); Hyung Jin Kim, Daejeon (KR); Young Hui Kim, Gyeonggi-do (KR); Jung Jin Lee, Daejeon (KR); Sung Woo Choi, Daejeon (KR); Roger Blanco Ribera, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 263 days.

(21) Appl. No.: 14/066,892

(22) Filed: Oct. 30, 2013

(65) Prior Publication Data

US 2014/0152768 A1    Jun. 5, 2014

(30) Foreign Application Priority Data

Oct. 30, 2012  (KR) .................. 10-2012-0121615

(51) Int. Cl.
*H04N 13/00* (2006.01)
(52) U.S. Cl.
CPC ....... *H04N 13/0018* (2013.01); *H04N 13/0033* (2013.01)
(58) Field of Classification Search
CPC .................... H04N 13/0018; H04N 13/0033
USPC .............................................. 348/43
See application file for complete search history.

(56) References Cited

U.S. PATENT DOCUMENTS

* cited by examiner

*Primary Examiner* — Jeffery Williams

(57) ABSTRACT

The present disclosure relates to a method and system for creating a dynamic floating window for stereoscopic contents, and more particularly, to a method and system for automatically creating a dynamic floating window for stereoscopic contents based on feature points.

10 Claims, 8 Drawing Sheets

METHOD AND SYSTEM FOR CREATING DYNAMIC FLOATING WINDOW FOR STEREOSCOPIC CONTENTS

CROSS-REFERENCE TO RELATED APPLICATION

This application claims priority of Korean Patent Application No. 10-2012-0121615, filed on Oct. 30, 2012, in the KIPO (Korean Intellectual Property Office), the disclosure of which is incorporated herein by reference.

BACKGROUND OF THE INVENTION

1. Field of the Invention

The present disclosure relates to a method and system for creating a dynamic floating window for stereoscopic contents, and more particularly, to a method and system for automatically creating a dynamic floating window for stereoscopic contents based on feature points.

2. Description of the Related Art

Three-dimensional (3D) stereoscopic imaging is gaining attention in the field of entertainment industries, for example, feature films, cartoon films, game contents, and the like.

Stereoscopic contents are being produced more and more owing to commercial success of 3D stereoscopic imaging, and recently, vigorous progress is being made in 3D remake to convert two-dimensional (2D) contents such as films shot in 2D to 3D stereoscopic contents. With the brisk growth of 3D stereoscopic imaging, many display device manufacturers are introducing new products based on augmented stereoscopic technologies.

Also, many camera rigs and software are being released to support the convenience of 3D content creation.

However, a 3D stereoscopic image may often cause visual discomfort to an audience. In a 3D stereoscopic image, visual discomfort of an audience is mainly induced by imperfectness of the 3D stereoscopic image. As a 3D stereoscopic image causes visual discomfort more frequently, the public interest in a 3D stereoscopic image becomes lower, and consequently, there may be benefits over the whole 3D stereoscopic imaging industry.

In particular, a stereoscopic window violation occurs when an object having a negative disparity value is partially occluded by the opposing edges of a screen, causing extreme visual fatigue to an audience.

FIG. 1 is a view illustrating a concept of a window violation.

In FIG. 1, both occlusion and stereopsis is displayed at a left edge of a screen. Stereopsis is implemented by a pair of stereoscopic images, and occlusion occurs when a zone represented in one of the pair of stereoscopic images is invisible in the other image.

That is, for a certain region in a pair of stereoscopic images, an audience can sense an image for stereopsis from one image, but cannot sense the image for stereopsis from the other image due to the absence of the corresponding image in the other image.

A conflict of occlusion and stereopsis is referred to as a window violation effect or a paradoxical stereo window, and may cause visual fatigue to an audience. In other words, a window violation effect is a phenomenon in which an audience feels uncomfortable in a situation of viewing due to a visual error in content perception associated with occlusion information more powerful than disparity information when an object having a negative disparity value (an object appearing in front of a screen) intersects the edge of a 2D screen.

FIG. 2 illustrates a concept of a conventional floating window for removing a window violation.

In FIG. 2, (a) illustrates a window violation in a stereoscopic image, that is, a reason that a conflict of occlusion and stereopsis occurs, and (b) illustrates a method of removing an area in which a conflict of occlusion and stereopsis occurs, by applying a floating window.

The floating window is represented as a black mask area in (b) of FIG. 2. The floating window is added to a right frame edge of a right image and a left frame edge of a left image among a pair of stereoscopic images.

The floating window may help display a floating window image appearing in front of a screen viewed from each of a left camera and a right camera. This floating window technique may greatly reduce visual fatigue even though it produces a result that certain areas are removed from a stereoscopic image.

A dynamic floating window is a technique of dynamically creating a floating window and suggests an effective solution to a window violation, however a conventional dynamic floating window has a limitation in that its use is restricted to a case in which information of a left camera and a right camera is explicit like 3D animation.

SUMMARY OF THE INVENTION

To solve the problems of the existing techniques, the present invention is directed to providing a method and system for creating a dynamic floating window for stereoscopic contents, and more particularly, to a method and system for automatically creating a dynamic floating window for stereoscopic contents based on feature points.

In particular, the present invention is directed to providing a system for creating a dynamic floating window for generating a three-dimensional (3D) stereoscopic image, the system comprising: a sequence input unit to receive an input of left and right image sequences; a feature point extraction unit to extract feature points having a negative disparity value corresponding commonly in the left and right image sequences; a clustering unit to perform clustering and ordering on the extracted feature points, to calculate a transformation amount for the clustering, and to apply temporal consistency; a constraint unit to receive a user command and apply a user constraint; and a dynamic floating window unit to calculate a final transformation amount to which the user constraint is applied, and to create and output left and right dynamic floating windows based on the final transformation amount.

The feature point extraction unit calculates a disparity value D for each image by the following Equation, by matching x coordinates of the corresponding feature points of the left image and the right image using a Speeded Up Robust Feature (SURF) algorithm:

$$\overline{D} = F_R - F_L$$

The clustering unit uses a K-mean clustering technique to classify the feature points into left and right clusters by a two-dimensional algorithm.

The clustering unit divides the feature points into five clusters, and performs feature point matching in a leftmost first cluster and a rightmost fifth cluster among the five clusters.

The clustering unit calculates the transformation amount and the temporal consistency using the following Equation:

$$E_b = \sum_{i=1}^{t} \sum_{j=1}^{n} (f_{Lij} - f_{Rij} + x_{ij})^2 + W_t \sum_{i=1}^{n} (x_{i+1} - x_i)^2$$

where t denotes a number of input sequence frames, and n denotes a number of feature points of left and right images in a left or right cluster.

The clustering unit calculates the transformation amount using the following Equation:

$$E_b = (F_R - F_L + Xa)^2 + W_t(\Delta Xa)^2$$

where $F_L$ and $F_R$ are t by n, and a is 1 by a vector n in which n has a value of 1. $\Delta X$ is t by a t derived matrix and $X_i - X_{i+1}$.

The constraint unit calculates the inputted user constraint energy by the following Equation:

$$E_c = W_c \sum_{i \in C} (x_i - c_i)^2$$

where C denotes a set of constrained frame numbers, c denotes a value of an i-th constraint, and $W_c$ denotes a weight of a user constraint item, and the constraint unit applies the calculated user constraint energy to the following Equation:

$$E = (F_R - F_L + Xa)^2 + W_t(\Delta Xa)^2 + W_c(\Pi X_a - C_v)^2$$

where $\Pi$ is t by a t circulant matrix, and m denotes a number of elements in a set C. $\Pi$ denotes a matrix in which columns corresponding to a constraint frame number for each row are filled with 1 and the rest is filled with 0. $C_v$ is t by an n matrix in which a constraint value is equal to $v_i$ in all the columns for each row of the n matrix.

In particular, the present invention is directed to providing a method of creating a dynamic floating window for generating a three-dimensional (3D) stereoscopic image, the method comprising: receiving left and right image sequences as an input; extracting feature points having a negative disparity value corresponding commonly in the left and right image sequences; clustering and ordering the extracted feature points; calculating a transformation amount for the clustering and applying temporal consistency; receiving a user command and applying a user constraint; calculating a final transformation amount to which the user constraint is applied; and creating and outputting left and right dynamic floating windows based on the final transformation amount.

The extracting of the feature points comprises calculating a disparity value D for each image by the following Equation, by matching x coordinates of the corresponding feature points of the left image and the right image using a Speeded Up Robust Feature (SURF) algorithm:

$$\overline{D} = F_R - F_L$$

The clustering and ordering uses a K-mean clustering technique to classify the feature points into left and right clusters by a two-dimensional algorithm.

The clustering and ordering comprises dividing the feature points into five clusters, and performing feature point matching in a leftmost first cluster and a rightmost fifth cluster among the five clusters.

The applying the temporal consistency comprises calculating the transformation amount and the temporal consistency using the following Equation:

$$E_b = \sum_{i=1}^{t} \sum_{j=1}^{n} (f_{Lij} - f_{Rij} + x_{ij})^2 + W_t \sum_{i=1}^{n} (x_{i+1} - x_i)^2$$

where t denotes a number of input sequence frames, and n denotes a number of feature points of left and right images in a left or right cluster.

The applying the temporal consistency comprises calculating the transformation amount using the following Equation:

$$E_b = (F_R - F_L + Xa)^2 + W_t(\Delta Xa)^2$$

where $F_L$ and $F_R$ are t by n, and a is 1 by a vector n in which n has a value of 1. $\Delta X$ is t by a t derived matrix and $X_i - X_{i+1}$.

The applying the user constraint comprises calculating the inputted user constraint energy by the following Equation:

$$E_c = W_c \sum_{i \in C} (x_i - c_i)^2$$

where C denotes a set of constrained frame numbers, c denotes a value of an i-th constraint, and $W_c$ denotes a weight of a user constraint item, and the applying the user constraint comprises applying the calculated user constraint energy to the following Equation:

$$E = (F_R - F_L + Xa)^2 + W_t(\Delta Xa)^2 + W_c(\Pi X_a - C_v)^2$$

where $\Pi$ is t by a t circulant matrix, and m denotes a number of elements in a set C. $\Pi$ denotes a matrix in which columns corresponding to a constraint frame number for each row are filled with 1 and the rest is filled with 0. $C_v$ is t by an n matrix in which a constraint value is equal to $v_i$ in all the columns for each row of the n matrix.

Other features and aspects will be apparent from the following detailed description, the drawings, and the claims.

BRIEF DESCRIPTION OF THE DRAWINGS

The above and other features and advantages will become more apparent to those of ordinary skill in the art by describing in detail exemplary embodiments with reference to the attached drawings, in which.

In the following description, the same or similar elements are labeled with the same or similar reference numbers.

DETAILED DESCRIPTION

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, a term such as a "unit", a "module", a "block" or like, when used in the specification, represents a unit that processes at least one function or operation, and the unit or the like may be implemented by hardware or software or a combination of hardware and software.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

Figure 1:
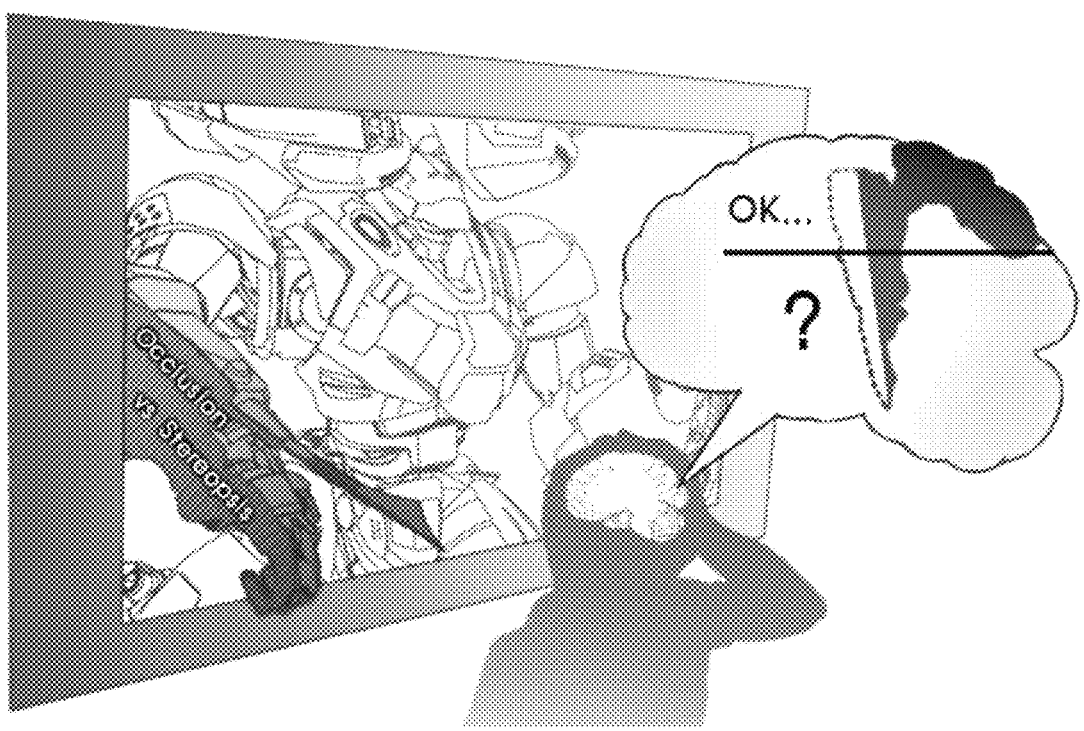
FIG. 1 is a view illustrating a concept of a window violation.
Figure 2:
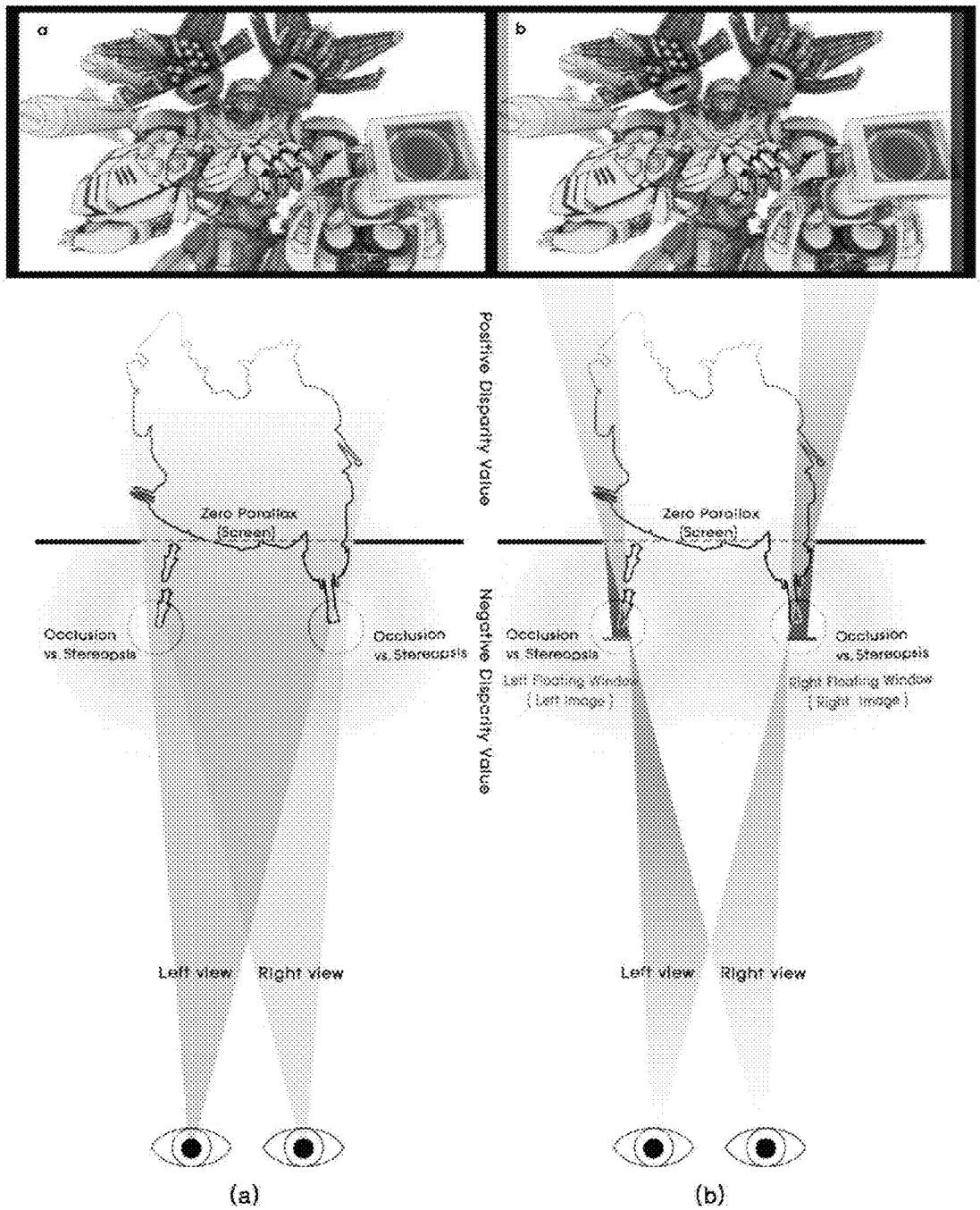
FIG. 2 illustrates a concept of a conventional floating window for removing a window violation.
Figure 3:
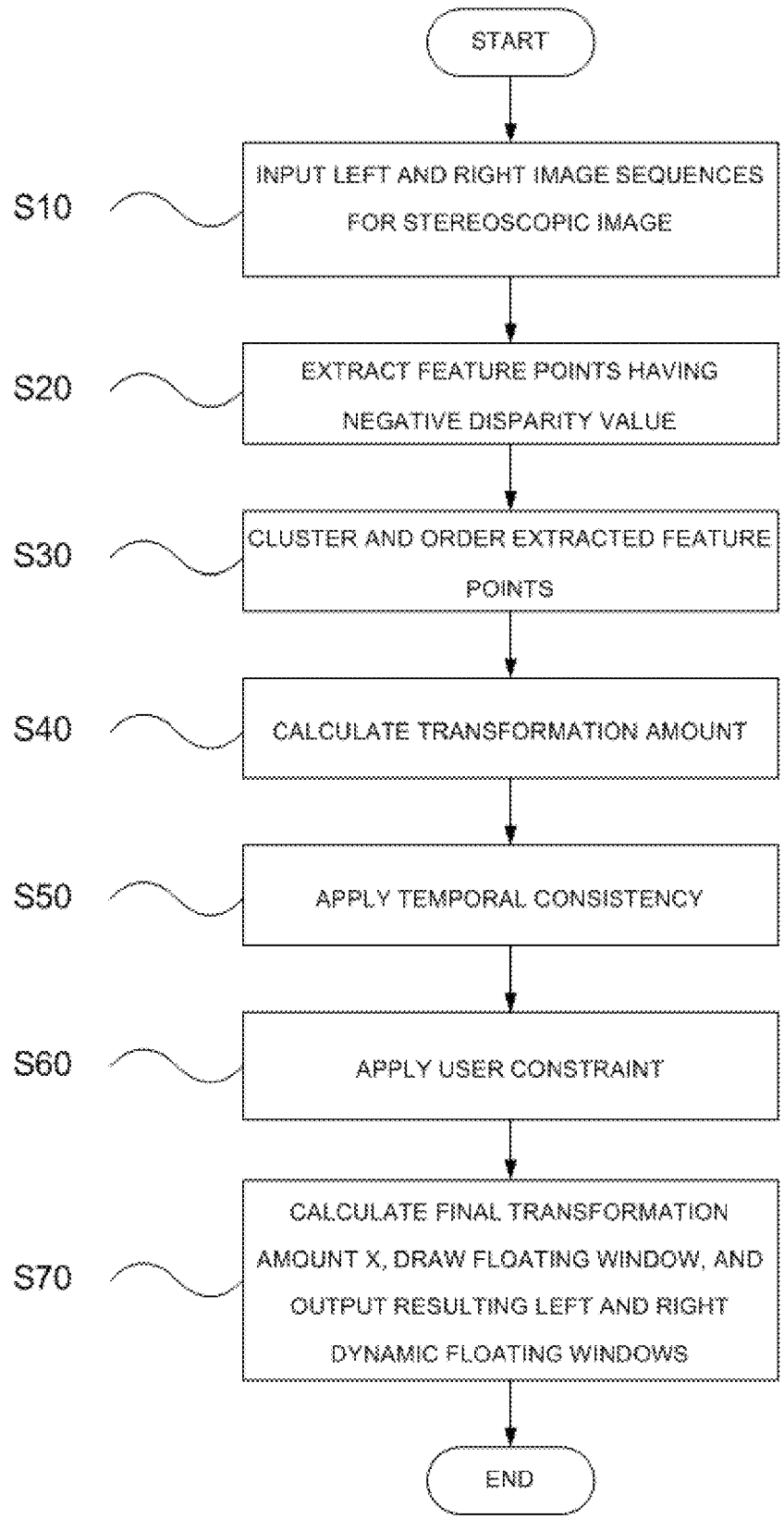
FIG. 3 illustrates a method of creating a dynamic floating window according to an exemplary embodiment.

FIG. 3 illustrates a method of creating a dynamic floating window according to an exemplary embodiment.

Referring to FIG. 3, the method of creating a dynamic floating window according to the present disclosure includes (S10) inputting left and right image sequences for a stereoscopic image, (S20) extracting feature points having a negative disparity value, (S30) clustering and ordering the extracted feature points, (S40) calculating a transformation amount, (S50) applying temporal consistency, (S60) applying a user constraint, and (S70) calculating a final transformation amount X, drawing a floating window, and outputting resulting left and right dynamic floating windows. Hereinafter, a detailed description of each step is provided.

First, when left and right image sequences for a stereoscopic image are inputted (S10), feature points having a negative disparity value corresponding commonly in the left and right image sequences are extracted (S20).

By matching x coordinates of the corresponding feature points of the left image and the right image using a Speeded Up Robust Feature (SURF) algorithm, a disparity value for each image may be calculated as shown in Equation 1.

$$D = F_R - F_L \qquad \text{Equation 1}$$

where FR and FL do not imply all features points in a scene, but features points having a negative disparity value D.

Among the feature points calculated in Equation 1, feature points having a negative disparity value are extracted.

Negative disparity represents an object or area appearing in front of a screen, and positive disparity represents an object appearing behind the screen. Non-matched positive disparity feature points at the opposing frame edges bring about frame occlusion but do not cause a window violation.

Figure 4:
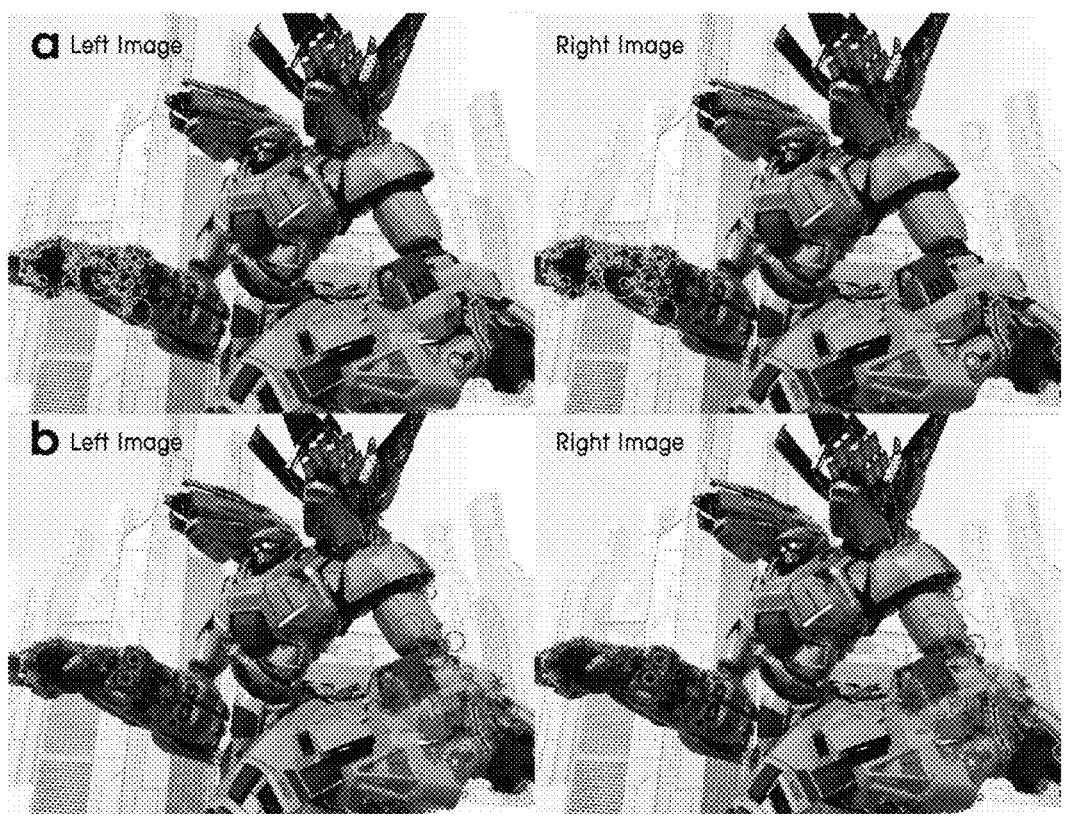
FIG. 4 illustrates an example of extraction of feature points for a floating window according to an exemplary embodiment.

FIG. 4 illustrates an example of extraction of feature points for a floating window according to an exemplary embodiment.

In FIG. 4, (a) shows an example of extraction of feature points for a left floating window, and (b) shows an example of extraction of feature points for a right floating window. That is, on the screen of the drawing, feature points having a negative disparity value among the feature points calculated in the above Equation 1 are extracted.

When extraction of the feature points is completed, clustering and ordering of the extracted feature points is performed (S30).

The present disclosure uses a K-mean clustering technique to classify the feature points into left and right clusters by a two-dimensional algorithm of x and z.

The present disclosure obtains an x coordinate of a left feature point of a left image, an x coordinate of a right feature point of a right image, and a z coordinate from disparity between corresponding two feature points among negative disparity feature points.

In the K-mean clustering technique, when K is 5, an initial center x is obtained by dividing an image resolution width by 5. For a value of z, 5 disparity based on a difference between a maximum value and a minimum value is obtained through excluding a controlled outside area from the overall disparity distribution.

The present disclosure is not directed to matching all the feature points, but determining a shift X as shown in FIG. 4, and clusters 2, 3, and 4 are ignored.

The feature points of cluster 1 are used to find a left window violation VL, and the feature points of cluster 5 are used to find a right window violation VR.

When clustering is completed, a transformation amount is calculated and temporal consistency is applied (S40, S50). To calculate a transformation amount, first, an energy function is calculated by Equation 2.

$$E_b = \sum_{i=1}^{t} \sum_{j=1}^{n} (f_{Lij} - f_{Rij} + x_{ij})^2 + W_t \sum_{i=1}^{n} (x_{i+1} - x_i)^2 \qquad \text{Equation 2}$$

where t denotes a number of input sequence frames, and n denotes a number of feature points of left and right images in a left or right cluster.

In Equation 2, a first item optimizes a transformation amount based on feature points, and a second item optimizes temporal consistency between a current frame and a previous frame or between a current frame and a next frame.

Wt represents a temporal weight of a sequence, and if a value of Wt increases, a difference between frames reduces and a floating window becomes more inaccurate. Accordingly, Equation 2 is transformed to Equation 3.

$$E_b = (F_R - F_L + Xa)^2 + W_t (\Delta Xa)^2 \qquad \text{Equation 3}$$

where FL and FR are t by n, and a is 1 by a vector n in which n has a value of 1. ΔX is t by a t derived matrix and Xi−Xi+1.

Also, the method of creating a dynamic floating window according to the present disclosure applies a user constraint (S60).

The user constraint may be applied as shown in Equation 4.

$$E_c = W_c \sum_{i \in C} (x_i - c_i)^2 \qquad \text{Equation 4}$$

Here, C denotes a set of constrained frame numbers, c denotes a value of an i-th constraint, and Wc denotes a weight of a user constraint item.

The present disclosure combines an original energy function Eb of Equation 3 and a user constraint energy Ec of Equation 4, to calculate a total energy function E. Then, E is calculated as shown in Equation 5.

$$E = (F_R - F_L + Xa)^2 + W_t(\Delta Xa)^2 + W_c(\Pi X_a - C_v)^2 \qquad \text{Equation 5}$$

where Π is t by a t circulant matrix, and m denotes a number of elements in a set C. Π denotes a matrix in which columns corresponding to a constraint frame number for each row are filled with 1 and the rest is filled with 0. Cv is t by an n matrix in which a constraint value is equal to vi in all the columns for each row of the n matrix.

Accordingly, in Equation 6, $$\arg_X \min E = 0 \qquad \text{Equation 6}$$

X is t by a vector 1 of output exchange values.

Equation 7 may be calculated by a first derivation of an energy function E.

$$AX = B \qquad \text{Equation 7}$$

$A = 2nI + nW_t(\Delta^T \Delta + \Delta \Delta^T) + nW_c(\Pi^T \Pi + \Pi \Pi^T)$
$B = 2W_c \Pi^T C_v a^T - 2Fa^T$ Here, A is t by a t matrix, X is t by a vector 1, and B is t by a vector 1. I is t by a t identify matrix, and F is FR−FL.

When the user constraint is completed, a final transformation amount X is calculated (S70). That is, a floating window is drawn, and resulting left and right dynamic floating widows are outputted (S70).

Figure 5:
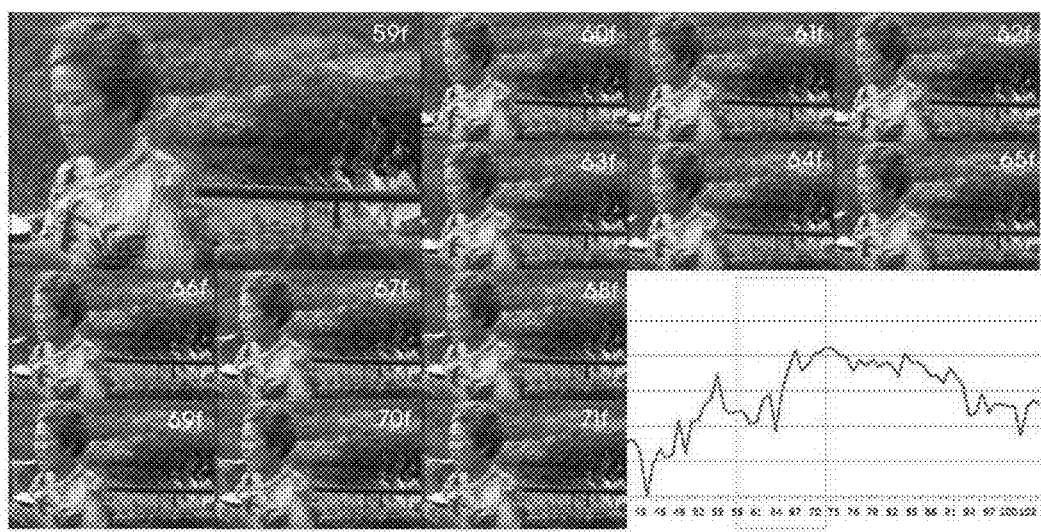
FIG. 5 illustrates an example of application of a dynamic floating window according to an exemplary embodiment.
Figure 6:
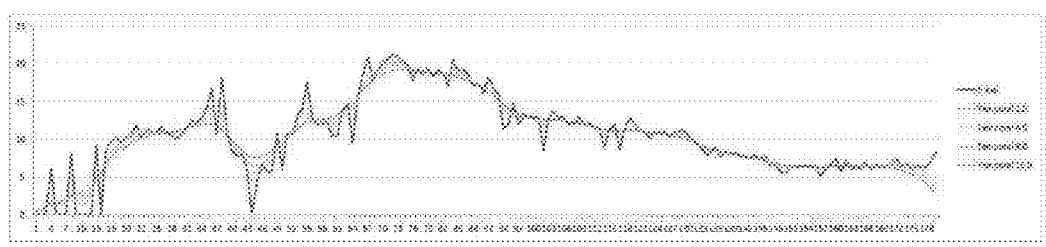
FIG. 6 illustrates an effect of a temporal weight in FIG. 5.

FIG. 5 illustrates an example of application of the dynamic floating window created according to the present disclosure, and FIG. 6 illustrates an effect of a temporal weight in FIG. 5.

A video sample applied in FIGS. 5 and 6 corresponds to an Interaced Live Sequence made up of data of 1050×638 and 180 frames, and has slow panning and a small disparity violation.

Figure 7:
FIG. 7 illustrates another example of application of a dynamic floating window according to an exemplary embodiment.
Figure 8:
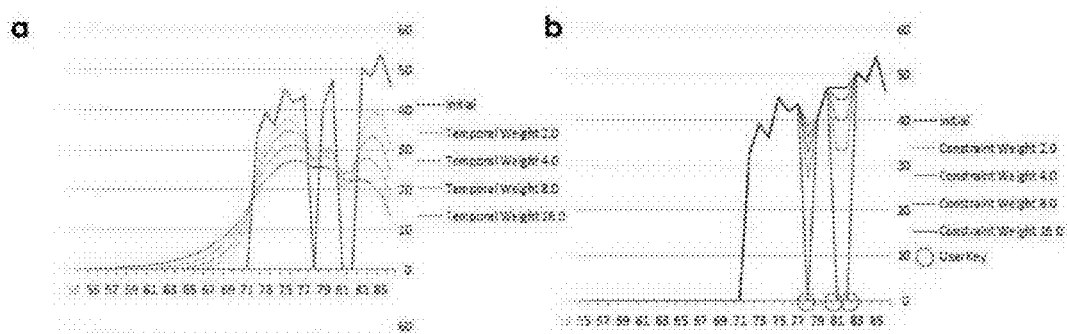
FIG. 8 illustrates an effect of a temporal weight and a user constraint weight in FIG. 7.

FIG. 7 illustrates another example of application of the dynamic floating window created according to the present disclosure, and FIG. 8 illustrates an effect of a temporal weight and a user constraint weight in FIG. 7.

A video sample applied in FIGS. 7 and 8 corresponds to a Cartoon Style Image Sequence made up of data of 800×450 and 85 frames, and has a quick motion and a large window violation.

Figure 9:
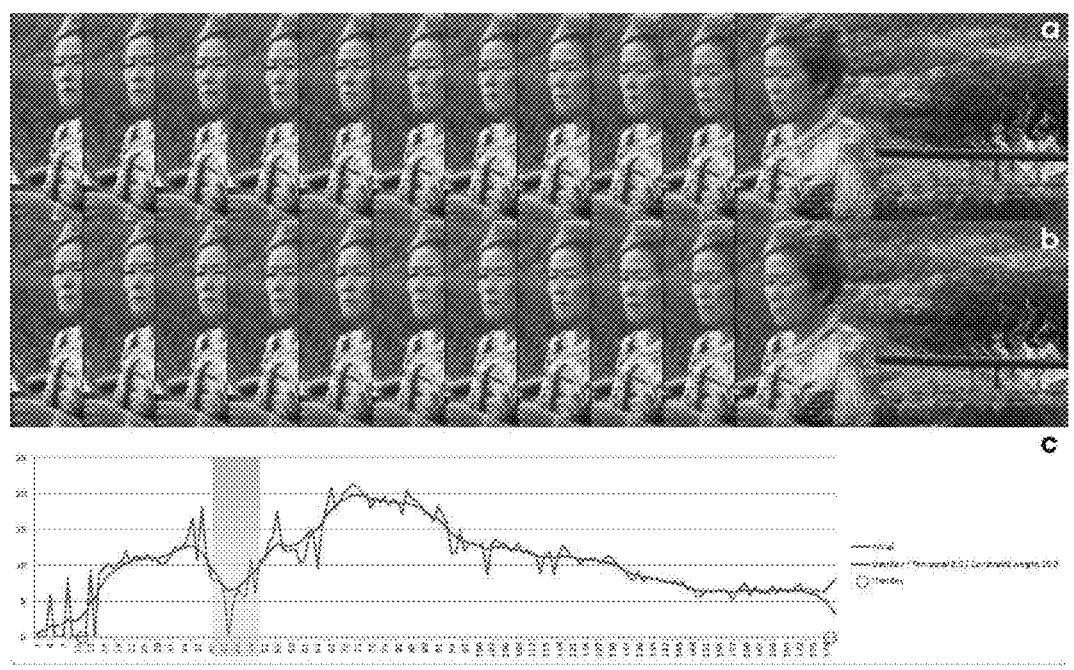
FIG. 9 illustrates still another example of application of a dynamic floating window according to an exemplary embodiment and a transformation value.

FIG. 9 illustrates still another example of application of the dynamic floating window created according to the present disclosure and a transformation value.

As shown in FIGS. 5 through 9, the floating window created according to the present disclosure may effectively remove a window violation, and is easy to apply a user constraint as well as providing temporal consistency.

Figure 10:
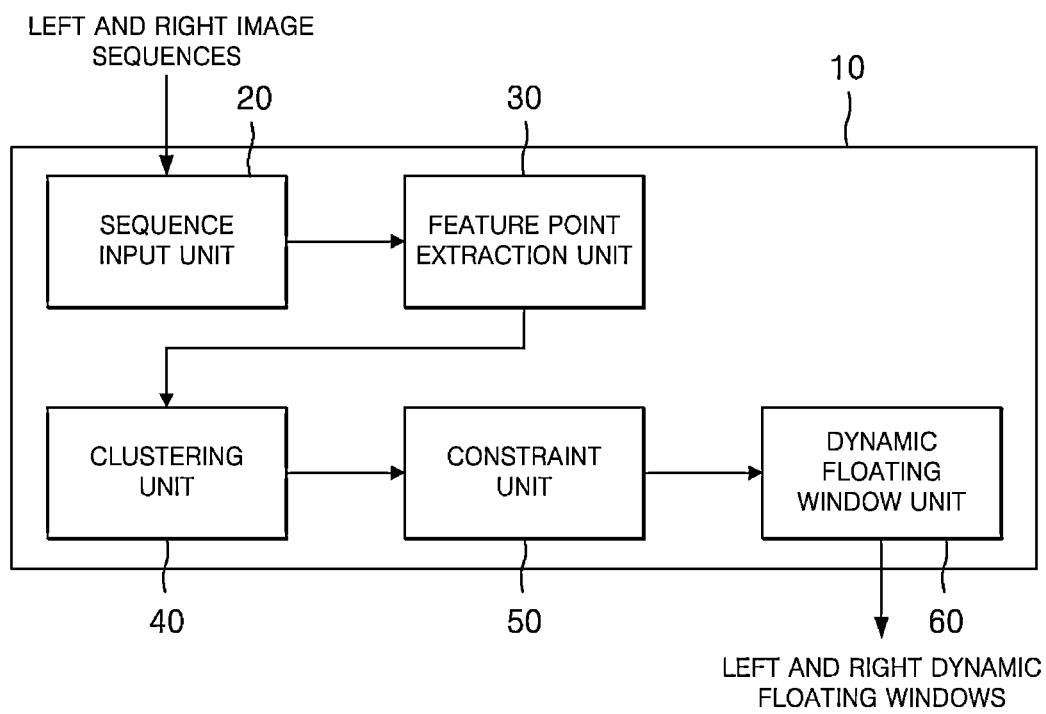
FIG. 10 illustrates a configuration of a system for creating a dynamic floating window for stereoscopic contents according to an exemplary embodiment.

FIG. 10 illustrates a configuration of a system 10 for creating a dynamic floating window for stereoscopic contents according to an exemplary embodiment.

As illustrated, the system 10 for creating a dynamic floating window is configured to include a sequence input unit 20, a feature point extraction unit 30, a clustering unit 40, a constraint unit 50, and a dynamic floating window unit 60.

First, the sequence input unit 20 receives an input of left and right image sequences, and transmits the received left and right image sequences to the feature point extraction unit 30.

The feature point extraction unit 30 extracts feature points having a negative disparity value corresponding commonly in the received left and right image sequences.

Also, the feature point extraction unit 30 calculates a disparity value for each image by the above Equation 1, by matching x coordinates of the corresponding feature points of the left image and the right image using a Speeded Up Robust Feature (SURF) algorithm.

The clustering unit 40 performs clustering and ordering on the extracted feature points, calculates a transformation amount for clustering, and applies temporal consistency.

Also, the clustering unit 40 uses a K-mean clustering technique to classify the feature points into left and right clusters by a two-dimensional algorithm.

Also, the clustering unit 40 divides the extracted feature points into five clusters, and performs feature point matching in a leftmost first cluster and a rightmost fifth cluster among the five clusters.

Also, the clustering unit 40 calculates a transformation amount for clustering and temporal consistency using the above Equation 2.

Also, the clustering unit 40 calculates a transformation amount for clustering using the above Equation 3.

The constraint unit 50 receives a user command and applies a user constraint.

Also, the constraint unit 50 calculates the inputted user constraint energy by the above Equation 4, and applies the calculated user constraint energy to the above Equation 5.

Finally, the dynamic floating window unit 60 calculates a final transformation amount to which the user constraint is applied, and creates and outputs left and right dynamic floating windows based on the final transformation amount.

The method according to the present disclosure may be embodied as computer-readable code in computer-readable media. The computer-readable media includes all types of recording devices for storing data that can be read by a computer system. The recording media includes, for example, read-only memory (ROM), random access memory (RAM), CD ROM disks, magnetic tape, floppy disks, optical media storage devices, and the like, and may include implementation in a form of a carrier wave (for example, transmission via an Internet). Also, the computer-readable recording medium can also be distributed over network-coupled computer systems so that the computer-readable code is stored and executed in a distributed fashion.

While the present disclosure has been described with reference to the embodiments illustrated in the figures, the embodiments are merely examples, and it will be understood by those skilled in the art that various changes in form and other embodiments equivalent thereto can be performed. Therefore, the technical scope of the disclosure is defined by the technical idea of the appended claims The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A system for creating a dynamic floating window for generating a three-dimensional (3D) stereoscopic image, the system comprising:
   a sequence input unit to receive an input of left and right image sequences;
   a feature point extraction unit to extract feature points having a negative disparity value corresponding commonly in the left and right image sequences;
   a clustering unit to perform clustering and ordering on the extracted feature points, to calculate a transformation amount for the clustering, and to apply temporal consistency;
   a constraint unit to receive a user command and apply a user constraint; and
   a dynamic floating window unit to calculate a final transformation amount to which the user constraint is applied, and to create and output left and right dynamic floating windows based on the final transformation amount;
   wherein the feature point extraction unit calculates a disparity value D for each image by the following Equation, by matching x coordinates of the corresponding feature points of the left image and the right image using a Speeded Up Robust Feature (SURF) algorithm:

$$\overline{D} = F_R - F_L$$

wherein $\overline{D}$ denotes the disparity value for each image, $F_R$ denotes the x coordinate of the corresponding feature point of the right image, and $F_L$ denotes the x coordinate of the corresponding feature point of the left image,
   wherein the clustering unit uses a K-mean clustering technique to classify the feature points into left and right clusters by a two-dimensional algorithm.

2. The system for creating a dynamic floating window of claim 1, wherein the clustering unit divides the feature points into five clusters, and performs feature point matching in a leftmost first cluster and a rightmost fifth cluster among the five clusters.

3. The system for creating a dynamic floating window of claim 1, wherein the clustering unit calculates the transformation amount and the temporal consistency using the following Equation:

$$E_b = \sum_{i=1}^{t} \sum_{j=1}^{n} (f_{Lij} - f_{Rij} + x_{ij})^2 + W_t \sum_{i=1}^{n} (x_{i+1} - x_i)^2$$

where t denotes a number of input sequence frames, and n denotes a number of feature points of left and right images in a left or right cluster.

4. The system for creating a dynamic floating window of claim 3, wherein the clustering unit calculates the transformation amount using the following Equation:

$$E_b = (F_R - F_L + Xa)^2 + W_t(\Delta Xa)^2$$

where $F_L$ and $F_R$ are t by n, a is 1 by a vector n in which n has a value of 1 and $\Delta X$ is t by a t derived matrix and $X_i - X_{i+1}$.

5. The system for creating a dynamic floating window of claim 4, wherein the constraint unit calculates the inputted user constraint energy by the following Equation:

$$E_c = W_c \sum_{i \in C} (x_i - c_i)^2$$

where C denotes a set of constrained frame numbers, c denotes a value of an i-th constraint, and Wc denotes a weight of a user constraint item, and the constraint unit applies the calculated user constraint energy to the following Equation:

$$E = (F_R - F_L + Xa)^2 + W_t(\Delta Xa)^2 + W_c(\Pi X_a - C_v)^2$$

where $\Pi$ is t by a t circulant matrix, and m denotes a number of elements in a set C, $\Pi$ denotes a matrix in which columns corresponding to a constraint frame number for each row are filled with 1 and the rest is filled with 0 and $C_v$ is t by an n matrix in which a constraint value is equal to $v_i$ in all the columns for each row of the n matrix.

6. A method of creating a dynamic floating window for generating a three-dimensional (3D) stereoscopic image, the method comprising:
   receiving left and right image sequences as an input;
   extracting feature points having a negative disparity value corresponding commonly in the left and right image sequences;
   clustering and ordering the extracted feature points;
   calculating a transformation amount for the clustering and applying temporal consistency;
   receiving a user command and applying a user constraint;
   calculating a final transformation amount to which the user constraint is applied;
   and
   creating and outputting left and right dynamic floating windows based on the final transformation amount;
   wherein said extracting of the feature points comprises calculating a disparity value D for each image by the following Equation, by matching x coordinates of the corresponding feature points of the left image and the right image using a Speeded Up Robust Feature (SURF) algorithm:

$$\overline{D} = F_R - F_L$$

wherein $\overline{D}$ denotes the disparity value for each image, $F_R$ denotes the x coordinate of the corresponding feature point of the right image, and $F_L$ denotes the x coordinate of the corresponding feature point of the left image,
   wherein said clustering and ordering uses a K-mean clustering technique to classify the feature points into left and right clusters by a two-dimensional algorithm.

7. The method of creating a dynamic floating window of claim 6, wherein said clustering and ordering comprises dividing the feature points into five clusters, and performing feature point matching in a leftmost first cluster and a rightmost fifth cluster among the five clusters.

8. The method of creating a dynamic floating window of claim 6, wherein said applying the temporal consistency comprises calculating the transformation amount and the temporal consistency using the following Equation:

$$E_b = \sum_{i=1}^{t} \sum_{j=1}^{n} (f_{Lij} - f_{Rij} + x_{ij})^2 + W_t \sum_{i=1}^{n} (x_{i+1} - x_i)^2$$

where t denotes a number of input sequence frames, and n denotes a number of feature points of left and right images in a left or right cluster.

9. The method of creating a dynamic floating window of claim 8, wherein said applying the temporal consistency comprises calculating the transformation amount using the following Equation:

$$E_b = (F_R - F_L + Xa)^2 + W_t(\Delta Xa)^2$$

where $F_L$ and $F_R$ are t by n, and a is 1 by a vector n in which n has a value of 1 and $\Delta X$ is t by a t derived matrix and $X_i - X_{i+1}$.

10. The method of creating a dynamic floating window of claim 9, wherein said applying the user constraint comprises calculating the inputted user constraint energy by the following Equation:

$$E_c = W_c \sum_{i \in C} (x_i - c_i)^2$$

where C denotes a set of constrained frame numbers, c denotes a value of an i-th constraint, and Wc denotes a weight of a user constraint item, and said applying the user constraint comprises applying the calculated user constraint energy to the following Equation:

$$E = (F_R - F_L + Xa)^2 + W_t(\Delta Xa)^2 + W_c(\Pi X_a - C_v)^2$$

where $\Pi$ is t by a t circulant matrix, and m denotes a number of elements in a set C, $\Pi$ denotes a matrix in which columns corresponding to a constraint frame number for each row are filled with 1 and the rest is filled with 0 and Cv is t by an n matrix in which a constraint value is equal to vi in all the columns for each row of the n matrix.

* * * * *